April 15, 1958  A. G. EVANS ET AL  2,830,516

TWO-WAY PLOW ATTACHMENT FOR TRACTORS

Filed Nov. 19, 1954  5 Sheets-Sheet 1

FIG. 1

INVENTORS
ARTHUR G. EVANS
WAYNE G. TOLAND
OTTO E. JOHNSON
BY

ATTORNEY

April 15, 1958    A. G. EVANS ET AL    2,830,516
TWO-WAY PLOW ATTACHMENT FOR TRACTORS
Filed Nov. 19, 1954    5 Sheets-Sheet 3

INVENTORS
ARTHUR G. EVANS
BY WAYNE G. TOLAND
OTTO E. JOHNSON

ATTORNEY

April 15, 1958  A. G. EVANS ET AL  2,830,516
TWO-WAY PLOW ATTACHMENT FOR TRACTORS
Filed Nov. 19, 1954  5 Sheets-Sheet 4

INVENTOR.
ARTHUR G EVANS
WAYNE G. TOLAND
OTTO E JOHNSON
BY
Paul O. Pippel
ATTORNEY April 15, 1958  A. G. EVANS ET AL  2,830,516
TWO-WAY PLOW ATTACHMENT FOR TRACTORS
Filed Nov. 19, 1954  5 Sheets-Sheet 5

INVENTORS.
ARTHUR G. EVANS
WAYNE G. TOLAND
OTTO E. JOHNSON
BY Paul O. Pippel

ATTORNEY

United States Patent Office 2,830,516
Patented Apr. 15, 1958

2,830,516

TWO-WAY PLOW ATTACHMENT FOR TRACTORS

Arthur G. Evans, Wayne G. Toland, and Otto E. Johnson, Canton, Ill., assignors to International Harvester Company, a corporation of New Jersey Application November 19, 1954, Serial No. 470,004

13 Claims. (Cl. 97—26)

This invention relates to tractor-propelled implements, and particularly, to control apparatus therefor. More specifically, the invention concerns an implement having alternately operable tool means, such as a two-way plow.

An object of the invention is the provision of a tractor-propelled implement having novel control means therefor.

Another object of the invention is the provision, in a tractor-propelled implement of the type including alternately operable tool units, of lift means for raising and lowering the implement, and means actuated by said lift means for placing the tool units alternately in operation.

A further object of the invention is the provision, in a two-way plow having right and left-hand plow units alternately movable to operating position and actuating means alternately shiftable between two operating positions for moving the respective plow units to operating position, of means for rendering said actuating means ineffective to shift from one operating position to the other.

Another object of the invention is the provision in an alternately operating two-way plow adapted to be mounted upon a tractor having power-lift means thereon connected to the plow for vertically moving the latter between operating and transport positions, of a separate connection between the lift means and the plow-operating means for effecting alternate operation of the plow units in response to actuation of the lift means.

Other objects and advantages of the invention will become clear from the following detailed description when read in conjunction with the accompanying drawings wherein.

Figure 1:
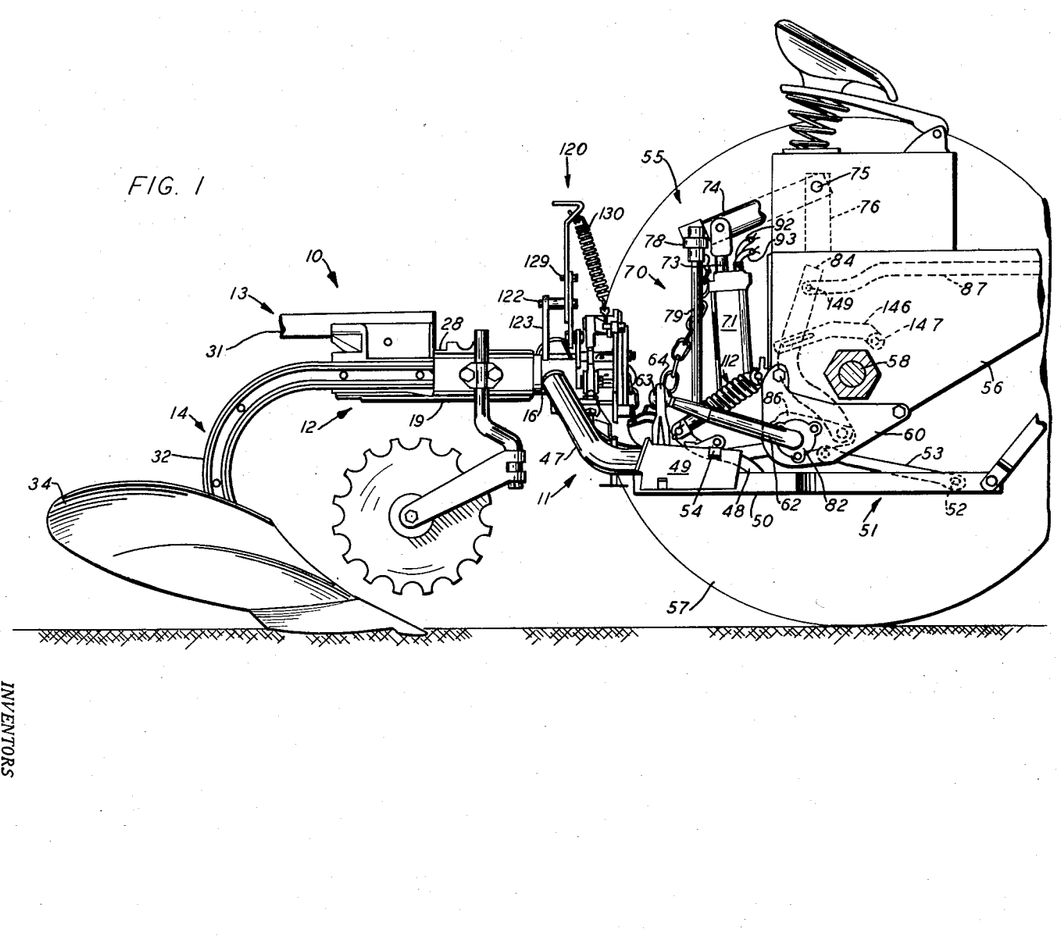
Figure 1 is a view in side elevation of the rear end of a tractor having mounted thereupon an implement attachment incorporating the features of this invention.
Figure 2:
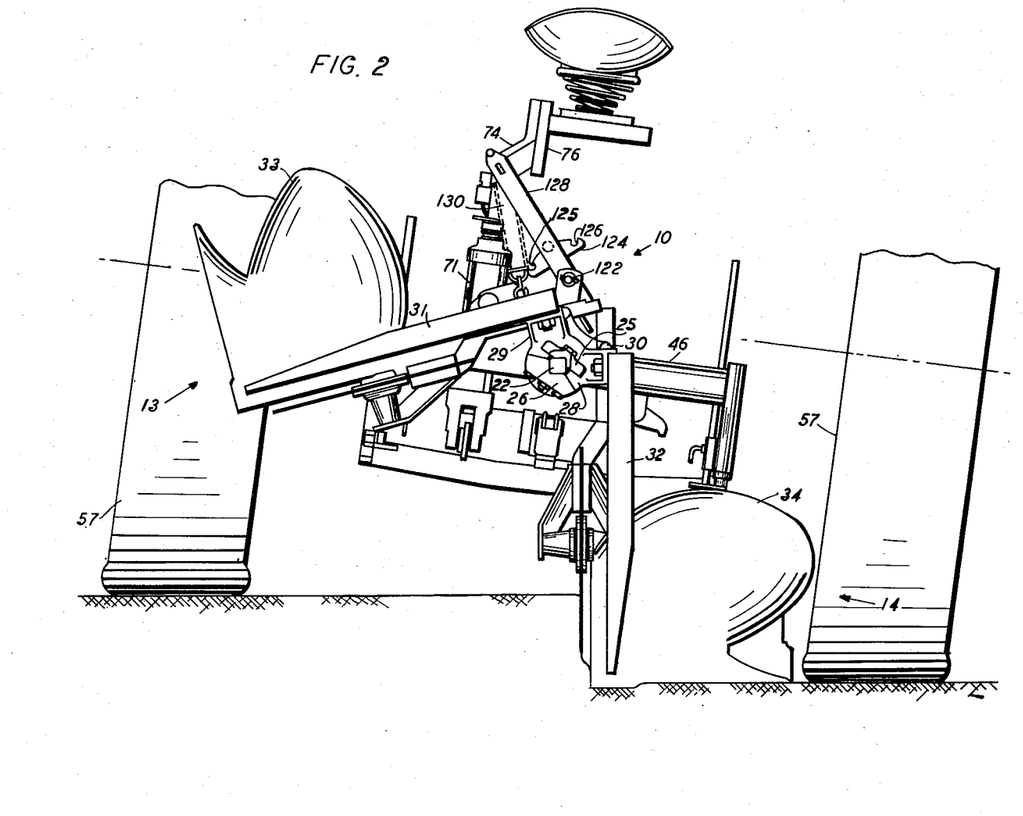
Figure 2 is a rear elevation, with parts removed for clarity, of the apparatus shown in Figure 1, showing the right-hand plow bottom of the two-way plow of this invention in operating position.

The implement with which this invention is concerned is a two-way plow of the revolving type wherein laterally spaced earth-working units are mounted upon a carrier which is rotatable about a longitudinal axis to alternately place one of the plow units in operation while the other is in an inoperative position. This type of plow utilizes left and right-hand plow bottoms so that alternate bottoms can be used in traversing a field in both directions while turning the soil in one direction. The implement is generally designated by the numeral 10, and includes a main or supporting frame 11 and a tool carrying frame 12. The tool-carrying frame 12 has mounted thereupon spaced left and right-hand plow units 13 and 14, respectively; and, as shown particularly well in Figure 2, these units are spaced apart less than 90°. The tool carrier 12 is rockable about a longitudinal axis, as hereinafter more fully set forth, in alternate clockwise and anti-clockwise directions to alternately place the plow units in operation as the machine traverses the field to be plowed.

Figure 8:
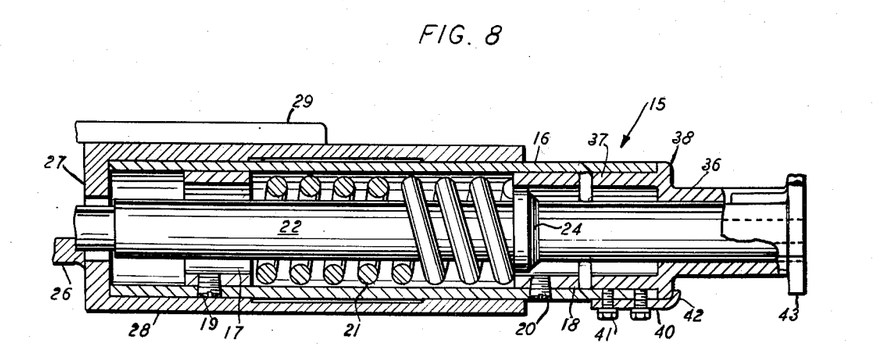
Figure 8 is a sectional view of the longitudinally extending part of the implement-supporting structure and of the tool carrier, with parts removed, and showing cushioning means acting between the tool carrier and its support to avoid damage to the plow when obstacles are encountered during operation.

The tool support 11 comprises a longitudinally extending tubular beam assembly 15 which comprises a tubular member 16 in which longitudinally spaced sleeves 17 and 18 are secured respectively by screws 19 and 20. These sleeves serve to confine a coil spring 21, see Fig. 8, which surrounds an elongated shaft 22, the forward end of which is broadened into a head 23.

A collar 24, affixed to the shaft 22, engages the forward end of spring 21, the rear end of which abuts the sleeve 17. The rear end of shaft 22 is received between a pair of clamping elements 25 and 26, the latter of which is integral with the end wall 27 of a cylindrical tool carrier 28 which slidably receives the tube 16, the end wall 27 engaging the rear end of the tube 16 in normal operation of the plow. By virtue of the fact that the shaft 22 is secured to the tool carrier 28, and that the collar 24 engages the forward end of spring 21, the tool carrier 28 is capable of longitudinal sliding movement rearwardly away from the tube 16 against the action of the spring 21. The tool carrier 28 is provided with left and right-hand pads 29 and 30, to which are affixed the horizontal portions of downwardly curved left and right-hand plow beams 31 and 32, having mounted upon their lower ends, respectively, plow bottoms 33 and 34. Plow bottoms 33 and 34 are left and right-hand bottoms, respectively, and form part of the earth-working tool units 13 and 14.

As has previously been noted, the shaft 22 with its head 23, and the tool carrier 28 upon which the plow units 13 and 14 are mounted, are capable of moving rearwardly against the tension of the spring 21, the purpose being to provide a cushioning effect for the operating plow unit when obstacles are encountered during operation, to avoid injury to the implement. It has also been noted that the tool carrier 28 is capable of rotary or rocking movement about the beam 16 in opposite directions to alternately place the left and right-hand plow units in operation, and this is accomplished by rocking the shaft 22 to which the tool carrier is affixed. The laterally broadened head 23 at the forward end of shaft 22 constitutes a key longitudinally slidably receivable in an elongated keyway 35, see Figs. 3 and 7, shaped to conform to and to closely confine the head 23. Keyway 35 is formed in a casting in the form of a control head 36 having a cylindrical portion 37, telescopically and rotatably receivable in the forward end of tubular beam member 16. The forward end of tube 16 engages a shoulder 38 on the casting 36, and the rear end of the tubular portion 37 engages the spring 21. Longitudinal movement of the control head 36 relative to the beam 16 is restrained by the provision of a clip 40 secured to the tube 16 by a bolt 41 and having a lip 42 engaging the shoulder 38, thus preventing relative longitudinal movement of the control head 36 while accommodating rotary movement thereof relative to the beam 16.

Rotation of the shaft 22 is transmitted from the control head 36 by virtue of the reception of head 23 in the keyway 35.

The forward end of head 36 has affixed thereto a transversely extending control member 43 functioning as a lever having arms 44 and 45 extending laterally from opposite sides of the axis of shaft 22. At this point, it should be clear that the lever arms 44 and 45 of member 43, by virtue of the latter's connection to the shaft 22 and tool carrier 28, serve as lever arms for transmitting force to rock the tool carrier alternately in opposite directions to dispose one of the earth-working tool units 13 or 14 in operating position while the other is held in an inoperative position.

Figure 3:
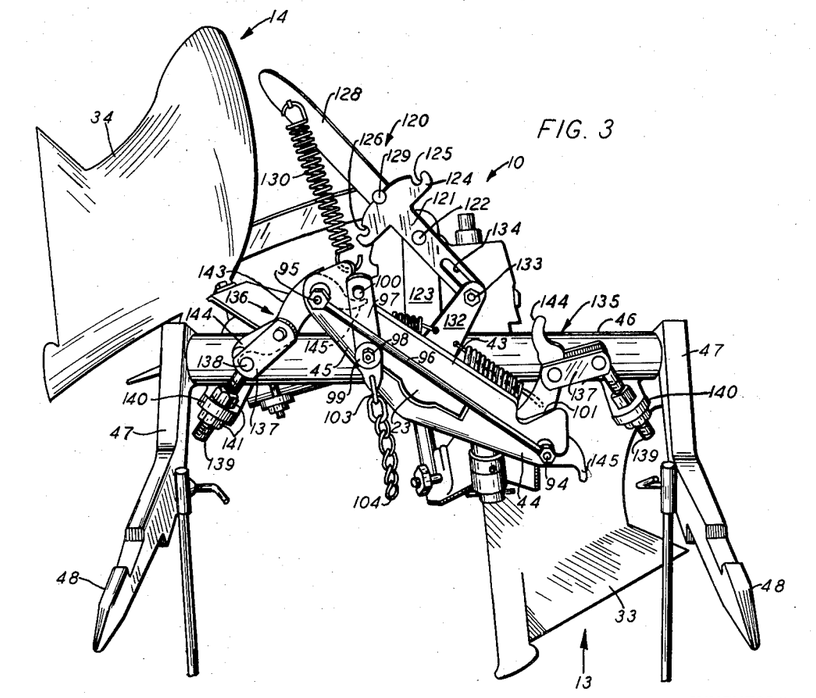
Figure 3 is a front elevation of the implement of this invention, illustrating some of the control mechanism therefor, and showing the position of the parts with the left-hand plow bottom in operation.

A frame bar 46, see Fig. 3, forms part of the support structure 15 and includes laterally spaced elements affixed to, and extending laterally from, the beam 16. Affixed to opposite ends of frame bar 46 are laterally spaced hitch bars 47 having shaft portions 48 at their forward ends adapted for sliding reception in longitudinally elongated socket members 49 affixed to the ends of the laterally spaced arms 50 of a U-shaped drawbar 51, the forward end of which is pivotally connected at 52 to a draft member 53, pivotally connected to the tractor to accommodate vertical swinging movement of the drawbar 50 as well as the draft member 53. The shafts 48 are held against relative displacement in the sockets 49 by the provision of latches 54. The drawbar 50 and sockets 49 form part of a tractor implement-attaching structure, generally designated at 55, which is substantially similar to the implement-attaching structure for tractors shown and described in copending U. S. application, Serial No. 338,651, filed February 25, 1953, now Patent No. 2,776,613.

It should be noted that by virtue of the connection of shafts 48 in the sockets 49 of the drawbar 50, the implement 10 is made integral with the tractor. The tractor comprises a longitudinally extending body 56, laterally spaced rear drive wheels 57, and a transverse rear axle 58. The tractor body has affixed thereto, and depending therefrom, a pair of laterally spaced brackets 59 and 60 adapted to rotatably support a transversely extending rockshaft 61, the ends of which are bent rearwardly to provide lift arms 62, each of which is connected through a knuckle joint 63 with a vertically extending lift link 64. The lower end of link 64 is pivotally mounted upon a longitudinally extending pivot pin 65 carried by an upright block 66 which, in turn, is mounted upon a pivot pin 67 carried by, and projecting inwardly from, the arm 50 of the drawbar 51. Link 64, at the end of each lift arm 62, is capable of laterally pivoting about the pin 65 as an axis as well as about the axis of pin 67, but link 64 and block 66 may be held against relative movement by the insertion of a pin 68 in an opening 69 in link 64 and a suitable registering opening in the block 66.

By virtue of the connection of the implement 10 to the attaching structure 55 of the tractor, it is made integral therewith so that the implement may be moved vertically relative to the tractor between operating and transport positions. Raising and lowering of the implement with respect to the tractor is accomplished by power-lift mechanism, generally designated at 70, which includes a hydraulic cylinder 71 anchored at its lower end to an extension 72 of bracket 59 on the left-hand side of the tractor. A piston rod 73 is slidable in the cylinder and is pivotally connected to an arm 74 which, in turn, is pivotally mounted at 75 upon a lug 76 secured to and projecting upwardly from the tractor body.

The end of link 74 pivotally supports a pin 77 carrying at its end a swivel 78 slidably receiving a vertically extending rod 79, the upper end of which is provided with a cap 80, and the lower end of which is pivotally connected to a rockarm 81, affixed to and projecting rearwardly from the rockshaft 61. Thus, by operating the cylinder and the piston unit 71, 73, rod 79 is lifted through the engagement of swivel 78 with cap 80 to rock the shaft 61 and the lift arms 62, the cylinder and piston unit operating in extension to raise the drawbar 51, and therefore the implement 10 to a transport position.

Figure 6:
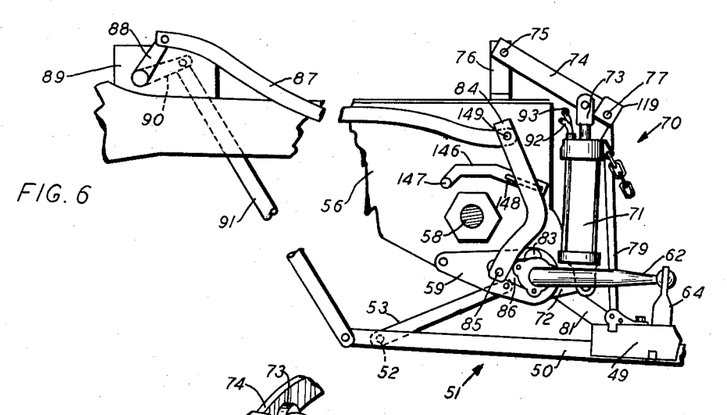
Figure 6 is a fragmentary view of the rear end of the tractor showing the implement-attaching means therefor and the lifting means by which the implement is raised and lowered, certain parts being omitted therefrom.

Leveling of the implement is provided for by mounting the right-hand end of the rockshaft 61 in bracket 60 through the intermediary of a universal connection 82 and a generally vertically extending slot 83 in the left-hand bracket 59, whereby the left-hand end of the rockshaft 61, and therefore the left-hand lift arm 62, may be vertically moved about the pivotal connection 82 as an axis to level the implement. Adjustment is accomplished by a lever 84 pivotally mounted at 85 upon the bracket 59 and having affixed thereto, by welding, a plate 86 supporting the left-hand end of the shaft 61. Lever 84 is connected by a link 87 to a power-lift rockarm 88, see Fig. 6, rocked by suitable power under the control of the tractor operator from a power source, indicated at 89 on the tractor, and deriving power from the tractor power plant. Another power-lift rockarm, similarly actuated, is mounted on the other side of the tractor and designated by the numeral 90. This arm 90 is connected by a rod 91 with the forward end of drawbar 51, whereby, upon operation of the power-lift arm 90, the drawbar 51, and therefore the hitch point of the implement may be adjusted vertically to regulate the operating depth of the earth-working tools. Fluid under pressure for vertically moving the implement 10 between operating and transport positions is supplied to the cylinder 71 through hose lines 92 and 93 from a source of fluid pressure, not shown, provided on the tractor.

Figure 7:
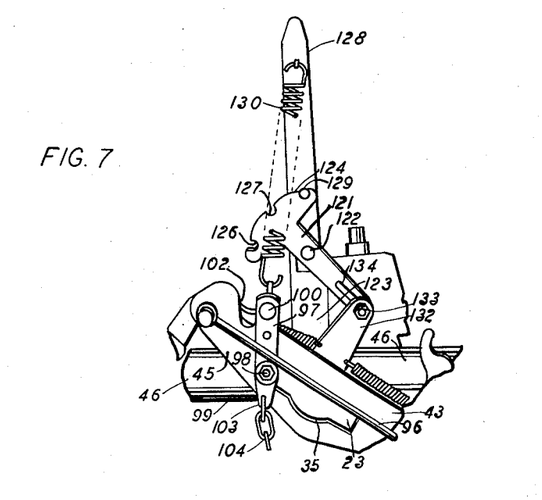
Figure 7 is a detail of a portion of the apparatus for locking the plow carrier about its longitudinal axis and shows the biasing means for shifting the actuating device adjusted to a position in which it is ineffective to dispose the parts in a position to rock the tool carrier.

The cylinder and piston unit 71, 73, in addition to being utilized for raising and lowering the implement, is also employed to actuate the apparatus by which the plow units 13 and 14 are alternately operated. In Figure 3, it will be noted that pivot bolts 94 and 95 are provided in the ends of the lever arms 44 and 45, respectively, of the control member 43. These bolts extend through the lever arm, and to the forward ends thereof are secured the ends of a transverse guide rod 96, spaced somewhat from the forward face of the member 43, and serving as a slideway for an actuating link 97 supporting a bolt 98 upon which is mounted a roller 99 engageable with the undersurface of the rod 96, as indicated particularly well in Figures 3 and 7. The upper end of link 97 has mounted thereupon a rearwardly extending pin 100 engageable with the upper edge of the control member 43. At this point, it should be clear that the actuating link 97 has a floating connection with the control member 43 so that it may float in the slideway provided between rod 96 and member 43 from a position adjacent lever arm 45, such as is indicated in Figures 3 and 7, to the other side of member 43 adjacent the end of lever arm 44.

Pin 100 is receivable in notches 101 and 102 in the lever arms 44 and 45, respectively. In the position of the parts in Figure 3, pin 100 is seated in the notch 102 at the end of lever arm 45; and in this position, by pulling downwardly upon the link 97, force will be exerted upon control member 43, shaft 22, and tool carrier 28 in a direction to rock the tool carrier anticlockwise, as viewed in Figure 3, to raise the earth-working tool unit 13 and lower the unit 14 to operating position.

Force is exerted upon the actuating link 97 to react upon lever arm 45 in a direction to reverse the position of the plow units, by the provision of a hook 103 at the lower end of link 97, and having connected thereto one end of a flexible member in the form of a chain 104. Chain 104 extends downwardly, and somewhat forwardly, and is trained around a pulley 105 mounted upon a shaft 106 mounted in a semi-circular trough 107. Trough 107 is mounted upon a pin 108 pivotally received in an aperture provided in the end of a bracket 109, including at its forward end a transversely extending socket member 110 adapted to rotatably receive the shaft 61 and retained thereon by two or more pins 111. Bracket 109 is resiliently held against vertical pivoting about the axis of shaft 61 by the provision of a cushioning member 112 comprising a part 113 pivotally connected to the bracket 109 and telescopically receiving a rod 114 pivotally mounted between a pair of lugs 115 affixed to the tractor body. A spring 116 engages the lugs 115 at one end and a collar 117 mounted on the part 113, at its other end. The cushioning member 112 serves the further purpose of preventing the plow from joggling or bouncing when transported, and it also prevents the taut chain 104 from damaging the plow if the implement parts are out of adjustment.

Figures 4, 9:
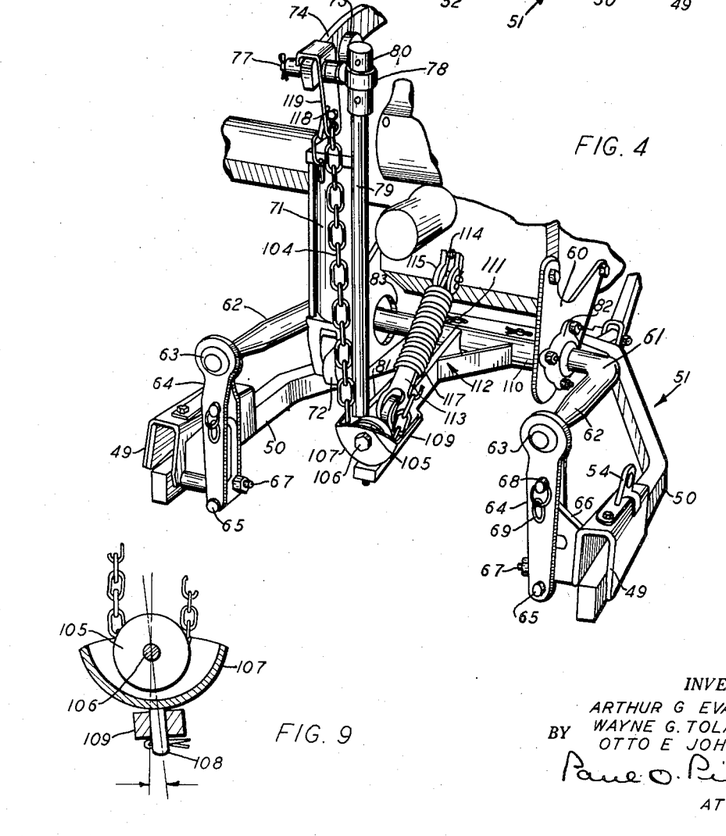
Figure 4 is a perspective view of the rear end of the tractor showing the attaching apparatus by which the implement of this invention is connected to the tractor.
Figure 9 is a sectional detail of a portion of the structure shown in Figure 4.

As shown particularly well in Figure 4, chain 104, after passing around the pulley 105 mounted in the housing 107, extends vertically upwardly and one of the links thereof is received in a slot 118 provided in a clip 119 mounted upon the pin 77 at the end of link 74. Thus, when the ram 71 is actuated to rock the link 74 to raise and lower the implement, chain 104 is likewise actuated and, through its connection with actuating link 97, exerts a force in a direction to rock the tool carrier 28 about its axis, to place one or the other of the earth-working units in operating position. It might be noted, however, that the position of chain 104 in slot 118 is adjusted so that slack is introduced into the chain when the implement is in operation providing lost motion between the control member 43, for turning the plow units, and the power lifting ram unit 71, 73. Thus, the chain 104 and the actuating link 97 are not effective to rock the earth-working tool carrier about its axis during the first stages of operation of the hydraulic ram unit 71, 73 to lift the implement to its transport position, but are only effective near the end of the piston stroke or after the plow bottom in operation has been elevated to a position near the surface of the ground so that the ground itself does not offer resistance to the rotation of the tool carrier.

In order to insure reception of pin 100 in the appropriate notch of lever arm 44 or lever arm 45 when it is desired to reverse the operation of the plow by raising the implement from the ground, biasing means is provided in the form of a lock-out lever 120 comprising a lower part 121 pivotally mounted upon a longitudinally extending peg 122 projecting forwardly from the upper end of a lug 123 affixed to and projecting upwardly from the tubular supporting beam 16, and having affixed to its upper end a quadrant member 124 having laterally spaced notches 125 and 126 therein and a central notch 127. Lock-out lever 120 also includes an upper elongated part 128, the lower end of which is mounted upon the peg 122 and which is also provided with a detent 129 selectively receivable in one of the notches 125, 126, or 127, by moving the part 128 over the quadrant about the axis of the peg 122. A spring 130 has one end anchored to the upper end of the lever part 128, and its lower end anchored to a lug 131 carried by the pin 100.

Lock-out lever 120 is rocked about its pivot 122 by means of a standard 132 affixed to and projecting upwardly from the casting 36. Standard 132 is provided at its upper end with a bolt 133 receivable in a slot 134 provided in the lower end of the lever part 121. Thus, upon rocking the member 43 and tool carrier 28 in a counter-clockwise direction as viewed in Figure 3, lock-out lever 120 is rocked about its pivot 122 from a position such as shown in Figure 3, to that of Figure 2. It will be noted in Figure 3 that the position of lockout lever 120 and spring 130 is such that the actuating link 97 is biased to the position in which the pin 100 is received in the notch 102 of lever arm 45. When the position of the earth-working units in Figure 3 is to be reversed, and the implement is lifted, the anchor point of spring 130 on the upper part 128 of the lock-out lever is moved to the opposite side of the pivot 122, so that actuating link 97 is caused to slide transversely along the control member 43 until it is received in the other notch 101, at which point the actuating link is in position to again return the earth-working unit to the position of Figure 3.

Figure 5:
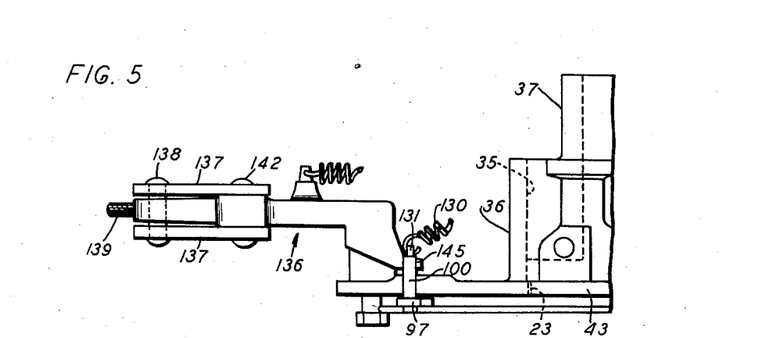
Figure 5 is a plan view, enlarged, and with parts removed for clarity, showing one of the toggle link locking, or latching, means for the control mechanism of this invention and its relationship to the lever means by which motion is transmitted from the tractor power lift to the tool carrier to alternately dispose the respective plow units in operating position.

The operating plow unit is locked in operating position by the provision of separate latching means, designated at 135 and 136. Since these latching devices are substantial duplicates, a description of one will suffice for both. In the position of the parts shown in Figure 3, latch 136 has become effective to lock the plow unit 13 in its operating position. The latch mechanism is in the form of a toggle device, and comprises laterally spaced links 137 carrying a pin 138 upon which is pivotally mounted an eyebolt 139 slidably receivable in an ear 140 affixed to one end of the bar 46 and threaded for the reception of nuts 141, by means of which adjustments can be made in the latch 136. The links 137 also carry a pin 142 upon which is pivotally mounted one end of a hook link 143 having a hook 144 engageable with the head 138 of the bolt 139, in the position of Figure 3. A hook 145 is also provided at the other end of link 143. As shown in Figures 3, 5, and 7, link 136 is pivotally mounted upon the bolt 95 at one end of member 43, and is provided with a laterally offset hook 145 which lies adjacent and follows the curvature of the notch 102. Hook 145 rests somewhat above the bottom of notch 102 and is engaged by pin 100. In the position of the parts in Figure 3, the toggle 136 has locked the plow unit 13 in operating position. Upon operation of the hydraulic cylinder 71 to lift the implement, and after a predetermined movement upwardly of the implement, chain 104 becomes taut and releases the latch 136 by causing pin 100 to press against hook 145 and throw the toggle off center. Further operation of the lifting means then rotates the tool carrier about its axis.

Successive lifting of the implement, after placing one of the units in operation, alternately moves the plow units into operation. As pointed out before, actuating link 97 slides from one end of member 43 to the other during alternate operation of the implement. Since the cylinder and piston unit 71, 73 is offset laterally from the center line of the tractor and from the bracket 109, provision is made to promote the rotation of pulley housing 107 to facilitate movement of the actuating link 97 from side-to-side of the control member 43. As indicated in Figure 9, this is accomplished by angling the outer end of bracket 109 to tilt the pulley housing 107, and therefore the axis of rotation thereof, thus allowing the part of chain 104 between the pulley and actuator link 97 to approach nearer the left-hand side of the control member 43 to promote seating of pin 100 in left-hand notch 101.

During operation of an implement of this type involving left and right-hand earth-working units, it is frequently desirable during operation, as for example, in crossing grass waterways in a field to be able to raise the implement to a transport position and again lower it when the waterway has been crossed, while retaining the same plow unit in operation. This is accomplished by moving the upper part 128 of lock-out lever 120 over the quadrant 124 to position the detent 129 in one of the notches 125 or 126. As shown in Figure 7, the detent has been received in notch 125, and in this position, the lock-out lever and the spring 130 are ineffective to urge the actuating link 97 to a position where it will be received in notch 102. Therefore, when the implement is raised, the tool carrier will not be rotated on its axis. When the other plow unit is to remain in operation during lifting and lowering, the part 128 of lever 120 is moved over the quadrant until detent 129 is received in the other notch 126.

It may be noted that it is desirable for certain implements when attached to the hitch structure 55 to be automatically leveled and this is accommodated by allowing the left-hand end of shaft 61 to float in the confines of slot 83. To accomplish this, connecting rod 87 is removed and arm 84 connected to a link 146 pivotally anchored at 147 to the tractor and having a slot 148 therein adapted to slidably receive the pin 149 at the end of arm 84.

A normal operating cycle of the two-way plow of this invention is initiated by lifting the implement to transport position on the tractor. If we assume the parts to be in the position of Figure 3, the left-hand plow unit 13 is in operating position. The implement is lifted by extending the piston rod 73 in cylinder 71. Slack is taken up in chain 104, which then pulls link 97 downwardly, exerting a force through pin 100 in notch 102 at the end of lever arm 45 to rock tool carrier 28 in a direction to place plow unit 14 in position for operation while unit 13 is raised. When the plow is lowered to operating position slack is again introduced into chain 104, the upper end of lever 120 moves to the opposite side of peg 122, causing spring 130 to bias link 97 and pin 100 toward the other end of control member 43 and notch 101, ready for again rotating the tool carrier the next time the implement is lifted.

It is believed that the operation of the two-way plow of this invention and the control apparatus therefor will be clearly understood from the foregoing description. It should likewise be understood, however, that modifications may be made in the invention without departing from the spirit thereof or the scope of the appended claims.

What is claimed is:

1. In an implement having right and left-hand plowing units adapted for mounting upon a tractor having power-lift means thereon shiftable relative to the tractor for vertically moving the implement between operating and transport positions on the tractor, a supporting frame having hitch means connected to the tractor in draft-receiving relation, a tool-carrying frame having right and left-hand plowing units mounted on said supporting frame and rotatable about a longitudinally extending axis relative to said supporting frame to place said plowing units alternately in operation, connecting means between said power-lift means on the tractor and said supporting frame for raising and lowering the implement by operation of said power-lift means, and separate means connecting said power-lift means to said tool-carrying frame for rotating the latter during raising of the implement to alternately place one of said plow units in operation while the other unit is moved to an inoperative position, spaced latching members comprising toggle links connected between said supporting frame and said tool-carrying frame and alternately operable to hold the respective of said plow units in operating position, and single releasing means movable for alternate engagement with said toggle links and alternately actuated by said separate connecting means breaking said toggles.

2. In an implement having right and left-hand plowing units adapted for mounting upon a tractor having power-lift means thereon movable between two positions relative to the tractor for vertically moving the implement between operating and transport positions on the tractor, a supporting frame having hitch means connected to the tractor in draft-receiving relation, a tool-carrying frame having right and left-hand plowing units mounted on said supporting frame and rotatable about a longitudinally extending axis relative to said supporting frame to place said plowing units alternately in operation, connecting means between said power-lift means on the tractor and said supporting frame for raising and lowering the implement upon actuation of said power-lift means, means serving as a lever affixed to said tool-carrying frame and extending laterally from opposite sides of the axis thereof, and a floating connection between said power-lift means and said lever translationally shiftable to opposite sides of said axis for rocking the lever in opposite directions upon operation of said lift means to vertically move the implement, said floating connection comprising a transverse guide member attached to said lever, a flexible member connected at one end to said lift means and having at its other end a sliding connection with said guide member, said sliding connection being shiftable to opposite sides of said axis to alternately rock the tool carrying frame in opposite directions upon operation of said lift means to vertically move the implement.

3. In an implement having a supporting frame, a tool carrier mounted on said supporting frame for rotation about an axis and having thereon a pair of spaced tools adapted for alternate operation upon rotation of the tool carrier in opposite directions, means serving as a lever arm affixed to said tool carrier adjacent its axis and extending laterally from opposite sides thereof, transverse guide means associated with said lever means, and an actuating member having sliding engagement with said guide means engageable with one end of said lever to rock the tool carrier in one direction about its axis to place one of said tool units in operating position, said actuating member being translationally shiftable along said guide means to the opposite side of said axis for operative engagement with the other end of said lever to rock the tool carrier in the other direction about its axis.

4. In an implement having a supporting frame, a tool carrier mounted on said supporting frame for rotation about an axis and having thereon a pair of spaced tools adapted for alternate operation upon rotation of the tool carrier in opposite directions, means serving as a lever arm affixed to said tool carrier adjacent its axis and extending laterally from opposite sides thereof, an actuating member engageable with said lever on one side of said axis operable to rock the tool carrier in one direction, said actuating member being shiftable bodily to the other side of said axis and operable to rock the tool carrier in the opposite direction, and means biasing said actuating member alternately toward opposite sides of said axis to dispose said member in position to rock said tool carrier, said biasing means comprising an arm pivotally mounted on said supporting frame, means connecting said lever to said arm for swinging the latter about its pivot to opposite sides of said axis, and spring means connecting said arm to said actuating member for biasing the latter alternately to opposite sides of said axis to dispose the actuating member in position to rock said lever means.

5. The invention set forth in claim 4, wherein said arm is in two parts, one of which is a quadrant having laterally spaced notches and a central notch, the other part being an arm portion pivoted on said one part to move along said quadrant and having a detent receivable in the central notch during the normal alternate rocking of the tool carrier to place one or the other of the tools in operation, said spring being connected between the arm portion and the actuating member.

6. The invention set forth in claim 5, wherein said arm portion is optionally movable over the quadrant to position said detent in one of the laterally outer notches in which position the line of force of said spring is ineffective to dispose said actuating member in position to rock said lever means.

7. In a two-way plow attachment for a tractor having power-lift means thereon, a supporting frame connected to the tractor in draft-receiving relation and including a longitudinally extending member, a tool carrier having spaced right and left-hand plow units thereon mounted on said member for rocking movement about the axis thereof in opposite directions to alternately dispose one of said plow units in operation while the other is in an inoperative position, means serving as a pair of levers affixed to and projecting laterally from opposite sides of said tool carrier, each said lever having a notch therein near its outer end, an actuating member having a part receivable in the notch in one of said levers and operatively connected to said tractor power-lift means for transmitting power from the latter to said lever to rock said tool carrier in one direction to dispose a selected one of said plow units in operating position, said actuating member being bodily shiftable laterally by the operation of said power-lift means to the notch in said other arm for rocking the tool carrier in the other direction.

8. In a two-way plow attachment for a tractor having power-lift means thereon, a supporting frame connected to the tractor in draft-receiving relation and including a longitudinally extending member, a tool carrier having spaced right and left-hand plow units thereon mounted on said member for rocking movement about the axis thereof in opposite directions to alternately dispose one of said plow units in operation while the other is in an inoperative position, means serving as a pair of levers affixed to and projecting laterally from opposite sides of said tool carrier, each said lever having a notch therein near its outer end, an actuating member having a part receivable in the notch in one of said levers and operatively connected to said tractor power-lift means for transmitting power from the latter to said lever to rock said tool carrier in one direction to dispose a selected one of said plow units in operating position, said actuating member being bodily shiftable laterally by the operation of said power-lift means to the notch in said other arm for rocking the tool carrier in the other direction, and guide means associated with said levers for guiding the actuating member from one notch to the other.

9. In a two-way plow attachment for a tractor having power-lift means thereon, a supporting frame connected to the tractor in draft-receiving relation and including a longitudinally extending member, a tool carrier having spaced right and left-hand plow units thereon mounted on said member for rocking movement about the axis thereof in opposite directions to alternately dispose one of said plow units in operation while the other is in an inoperative position, means serving as a pair of levers affixed to and projecting laterally from opposite sides of said tool carrier, each said lever having a notch therein near its outer end, an actuating member having a part receivable in the notch in one of said levers and operatively connected to said tractor power-lift means for transmitting power from the latter to said lever to rock said tool carrier in one direction to dispose a selected one of said plow units in operating position, said actuating member being bodily shiftable laterally by the operation of said power-lift means to the notch in said other arm for rocking the tool carrier in the other direction, guide means associated with said levers for guiding the actuating member from one notch to the other, biasing means alternately urging said actuating member to the respective of said notches for rocking said tool carrier in opposite directions including a rockable member mounted on said supporting frame and alternately rockable toward the respective of said notches, and spring means connecting said rockable member to said actuating member.

10. In a two-way plow attachment for a tractor having power-lift means thereon, a supporting frame connected to the tractor in draft-receiving relation and including a longitudinally extending member, a tool carrier having spaced right and left-hand plow units thereon mounted on said member for rocking movement about the axis thereof in opposite directions to alternately dispose one of said plow units in operation while the other is in an inoperative position, means serving as a pair of levers affixed to and projecting laterally from opposite sides of said tool carrier, each said lever having a notch therein near its outer end, an actuating member having a part receivable in the notch in one of said levers and operatively connected to said tractor power-lift means for transmitting power from the latter to said lever to rock said tool carrier in one direction to dispose a selected one of said plow units in operating position, said actuating member being bodily shiftable laterally by the operation of said power-lift means to the notch in said other arm for rocking the tool carrier in the other direction, guide means associated with said levers for guiding the actuating member from one notch to the other, biasing means alternately urging said actuating member to the respective of said notches for rocking said tool carrier in opposite directions including a rockable member mounted on said supporting frame and alternately rockable toward the respective of said notches, spring means connecting said rockable member to said actuating member, and means operatively connecting said tool carrier to said rockable member for rocking the latter in response to rotation of said tool carrier.

11. In a two-way plow attachment for a tractor having power-lift means thereon, a supporting frame connected to the tractor in draft-receiving relation and including a longitudinally extending member, a tool carrier having spaced right and left-hand plow units thereon mounted on said member for rocking movement about the axis thereof in opposite directions to alternately dispose one of said plow units in operation while the other is in an inoperative position, means serving as a pair of levers affixed to and projecting laterally from opposite sides of said tool carrier, each said lever having a notch therein near its outer end, an actuating member having a part receivable in the notch in one of said levers and operatively connected to said tractor power-lift means for transmitting power from the latter to said lever to rock said tool carrier in one direction to dispose a selected one of said plow units in operating position, said actuating member being bodily shiftable laterally by operation of said power-lift means to the notch in said other arm for rocking the tool carrier in the other direction, and alternately operable toggle locking means connecting said levers to said supporting frame to hold the tool carrier against rotation and including a part engageable by said actuating member operable to break said toggle upon operation of said lift means to turn the tool carrier.

12. In a two-way plow attachment for a tractor having power-lift means thereon, a supporting frame connected to the tractor in draft-receiving relation and including a longitudinally extending member, a tool carrier having spaced right and left-hand plow units thereon mounted on said member for rocking movement about the axis thereof in opposite directions to alternately dispose one of said plow units in operation while the other is in an inoperative position, means serving as a pair of levers affixed to and projecting laterally from opposite sides of said tool carrier, each said lever having a notch therein near its outer end, an actuating member having a part receivable in the notch in one of said levers and operatively connected to said tractor power-lift means for transmitting power from the latter to said lever to rock said tool carrier in one direction to dispose a selected one of said plow units in operating position, said actuating member being bodily shiftable laterally by operation of said power-lift means to the notch in said other arm for rocking the tool carrier in the other direction, lift linkage connecting said lift means to said supporting frame for raising and lowering the latter, and a separate connection between said lift means and said actuating member for actuating the latter to turn the tool carrier.

13. In a two-way plow attachment for a tractor having power-lift means thereon, a supporting frame connected to the tractor in draft-receiving relation and including a longitudinally extending member, a tool carrier having spaced right and left-hand plow units thereon mounted on said member for rocking movement about the axis thereof in opposite directions to alternately dispose one of said plow units in operation while the other is in an inoperative position, means serving as a pair of levers affixed to and projecting laterally from opposite sides of said tool carrier, each said lever having a notch therein near its outer end, an actuating member having a part receivable in the notch in one of said levers and operatively connected to said tractor power-lift means for transmitting power from the latter to said lever to rock said tool carrier in one direction to dispose a selected one of said plow units in operating position, said actuating member being bodily shiftable laterally by the operation of said power-lift means to the notch in said other arm for rocking the tool carrier in the other direction, guide means associated with said levers for guiding the actuating member from one notch to the other, biasing means alternately urging said actuating member to the respective of said notches for rocking said tool carrier in opposite directions including a rockable member mounted on said supporting frame and alternately rockable toward the respective of said notches, and spring means connecting said rockable member to said actuating member, said rockable member being adjustable to render said spring ineffective to alternately urge the actuating member to the respective of said notches.

References Cited in the file of this patent

UNITED STATES PATENTS

| | | |
|---|---|---|
| 2,618,214 | Ball | Nov. 18, 1952 |
| 2,625,089 | Pursche | Jan. 13, 1953 |
| 2,633,788 | Nelson | Apr. 7, 1953 |

FOREIGN PATENTS

| | | |
|---|---|---|
| 979,429 | France | Dec. 6, 1950 |